(Model.)
J. T. LEWMAN.
MOLE TRAP.
No. 366,963. Patented July 19, 1887.
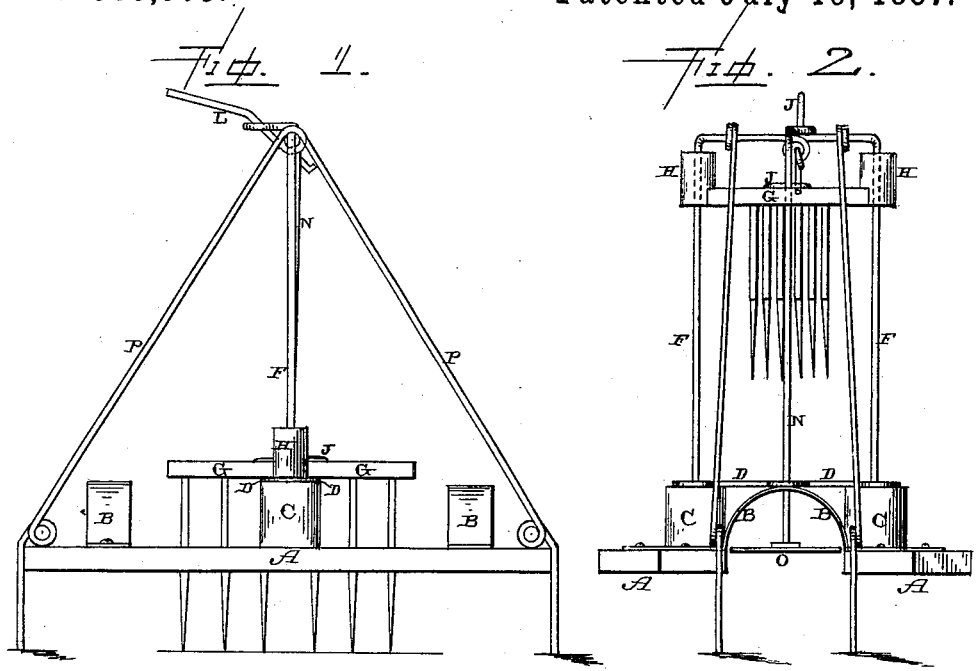
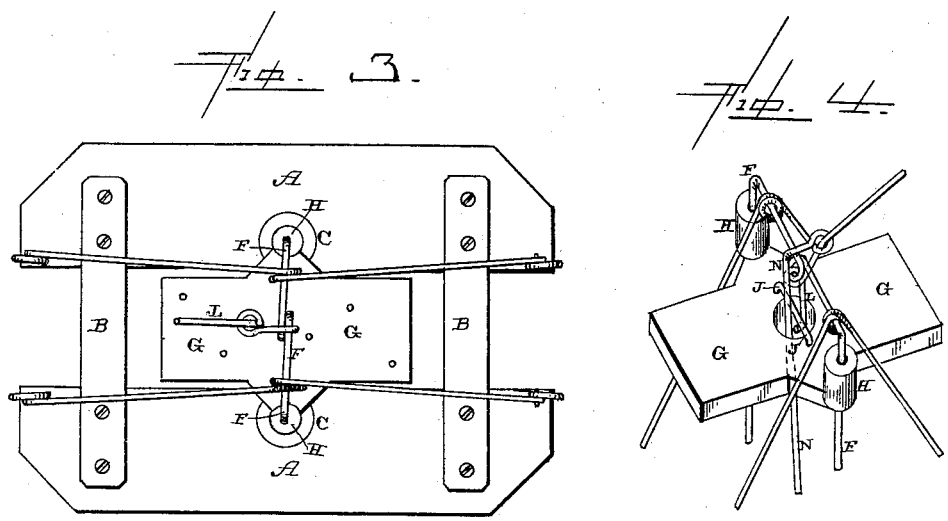
Witnesses.
R. T. Gardner
Edm. P. Ellis
Inventor.
J. T. Lewman,
per
F. A. Lehmann, atty.
N. PETERS, Photo-Lithographer, Washington, D. C.

UNITED STATES PATENT OFFICE.

JOHN T. LEWMAN, OF LEATHERWOOD, INDIANA.

MOLE-TRAP.

SPECIFICATION forming part of Letters Patent No. 366,963, dated July 19, 1887.

Application filed May 9, 1887. Serial No. 237,613. (M del.)

*To all whom it may concern:*

Be it known that I, JOHN T. LEWMAN, of Leatherwood, in the county of Parke and State of Indiana, have invented certain new and useful Improvements in Mole-Traps; and I do hereby declare the following to be a full, clear, and exact description of the invention, such as will enable others skilled in the art to which it pertains to make and use it, reference being had to the accompanying drawings, which form part of this specification.

My invention relates to an improvement in mole-traps; and it consists in the combination of two strips or boards, which form base-plates and which are connected together by curved strips, wires, or rods which are so formed at their centers as to form braces, and which have their ends bent so as to be forced into the ground and thus anchor the trap in place, suitable guides, which extend upward from the base-plates, the drop provided with sharp points, the trigger, and the rod which operates the trigger, as will be more fully described hereinafter.

The object of my invention is to provide a mole-trap in which the frame-work for the drop is braced in position by the same rods, which have their ends so formed as to be forced into the ground and thus anchor the trap in place.

Figure 1 is a side elevation of a trap embodying my invention. Fig. 2 is an end view of the same, the drop being shown raised upward. Fig. 3 is a plan view. Fig. 4 is a perspective of the falling weight and the trigger mechanism.

A represents two strips which form base-plates and which are rigidly connected together by means of arched plates B. These strips are separated just far enough to rest upon opposite sides of the mole-hill, and the strips are arched upward sufficiently high to allow the mole to pass under them toward the center of the trap. Secured at the center of the inner edge of each of the strips A is a block, C, which rises upward any suitable distance, and upon the top of which is placed the plate D, which has an opening through its center for the passage of the trigger-rod. Passing through the block C and the ends of the plate D is the wire F, which is bent, as shown, so as to form a frame in which the drop G has its vertical play. This drop consists of a metallic casting of any suitable weight having sharp prongs projecting from its under side, and having a guide, H, formed upon opposite edges, through which the wire or rod F passes, for the purpose of guiding the drop in its movements. Through the center of the drop G is formed an opening through which the trigger-rod passes, and extending across the top of this opening is a short rod, J, under which the end of the trigger L catches. The top portion of the frame formed by the rod or wire, F, has a suitable loop formed in it, and in this loop the trigger L is pivoted. The trigger-rod N, having a plate, O, secured to its lower end and which passes through the opening in the center of the plate D, up through the opening in the center of the drop G, has its upper end bent at right angles and made to catch over the trigger. When the plate O and the trigger-rod is raised upward by the passage of the mole under it, the rod trips the trigger and the weight descends.

The frame, which is formed by the rod or wire F, is braced in position by the two rods P, which extend upward from the ends of the strips A, and which are connected to the frame, as shown. The lower ends of the rods P are bent downward and made to extend any suitable distance below the ends of the strips A, so as to be forced into the ground and form anchors to hold the trap in place. These rods P, it will be seen, serve both to brace the frame in which the drop moves in position and to form anchors for holding the trap in position.

The operation of the trap is as follows: The trap is first placed over the track of the mole and the ends of the rods P are forced down into the ground until the strips rest solidly thereon. The mole passing along back through the track passes under one of the anchors B toward the center of the trap, where it forces upward the plate O, and thereby trips the trigger. The drop G, which has previously been raised and supported by the trigger, descends and the sharp spikes are driven into the mole.

I am aware that a mole-trap adapted to have its base rest upon opposite sides of the mole-hill and to have its trigger mechanism connected to and operated by a lever that has one end to rest upon the mole-hill, so that when the lever is raised at its inner end by the mole a spring-actuated spiked plate is released from the trigger and driven downward, is not new, and this I disclaim.

Having thus described my invention, I claim—

In a mole-trap, the combination of the two strips A, which bear upon the top of the ground, upon opposite sides of the mole-hill, the two arches B, which extend across the two strips and connect them together, the framework formed by the rod or wire F, and which projects above the strips at their centers to support the trigger, the metallic stop G, provided with sharp points upon its under side, having an opening through its center for the passage of the trigger-rod, and having the rod J extended across the top of the opening to engage with the trigger, the trigger-rod, which has the plate O connected to its lower end and which extends up through the stop G, the trigger pivoted upon the brace-rods P, and the brace-rods which brace the rods or wire F in position at their centers, and having their lower ends to project down below the strips, so as to catch in the ground and hold the strips in position, substantially as shown and described.

In testimony whereof I affix my signature in presence of two witnesses.

JOHN T. LEWMAN.

Witnesses:
F. A. LEHMANN,
A. S. PATTISON.